Figure 1:
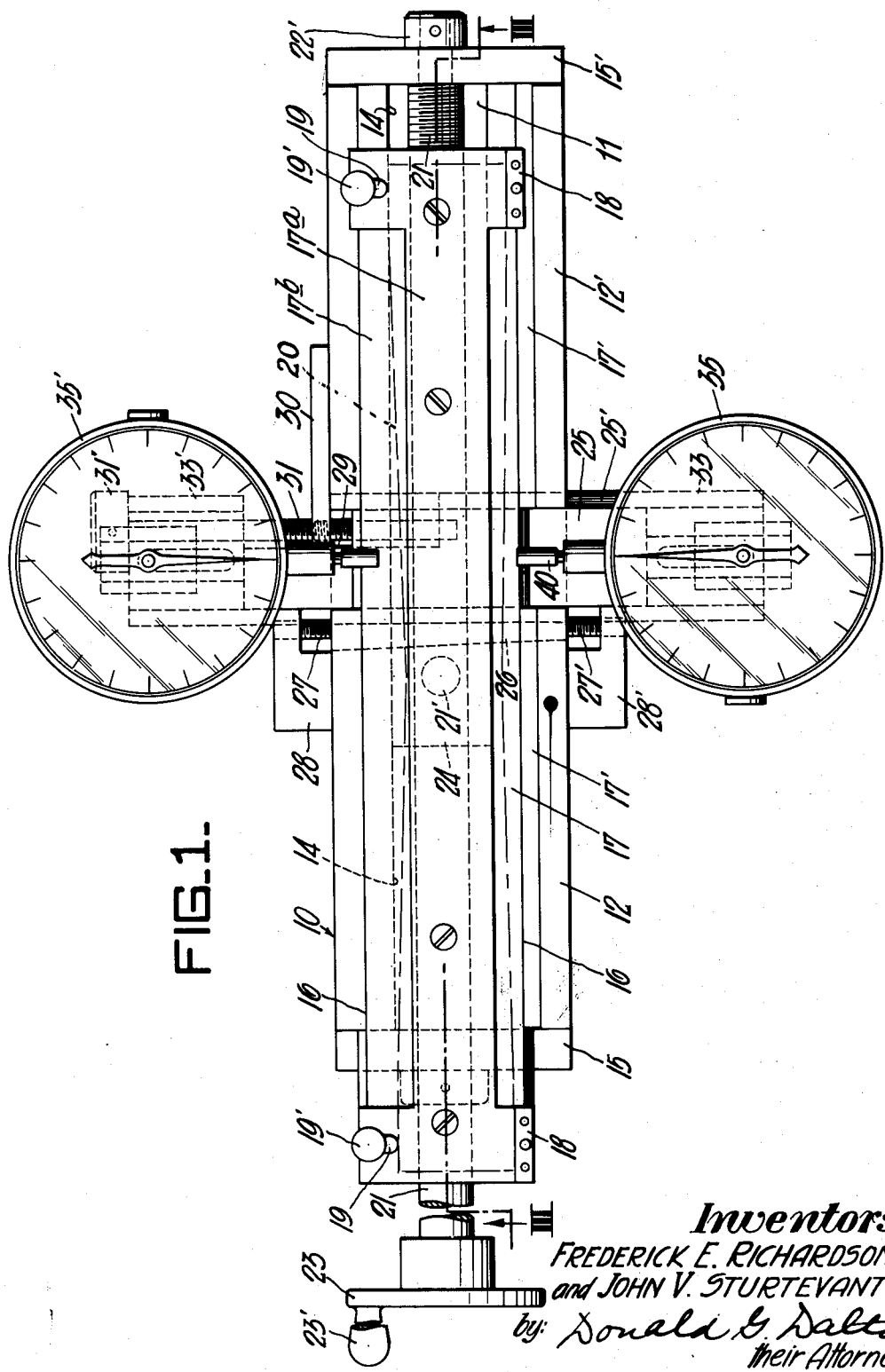

Sept. 13, 1955  F. E. RICHARDSON ET AL  2,717,452
APPARATUS FOR DETERMINING THE CONTOUR
OF SHEET-METAL TEST SPECIMENS
Filed Dec. 23, 1949  4 Sheets-Sheet 1

Inventors:
FREDERICK E. RICHARDSON
and JOHN V. STURTEVANT,
by: Donald G. Dalton
their Attorney.

Sept. 13, 1955  F. E. RICHARDSON ET AL  2,717,452
APPARATUS FOR DETERMINING THE CONTOUR
OF SHEET-METAL TEST SPECIMENS
Filed Dec. 23, 1949  4 Sheets-Sheet 2
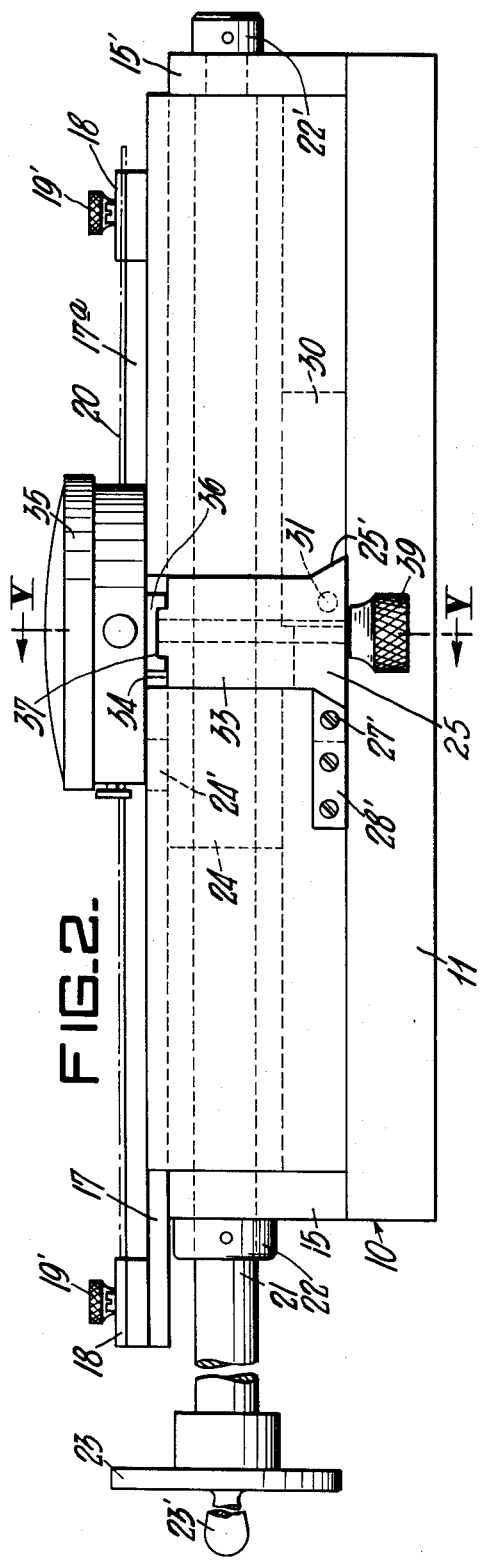
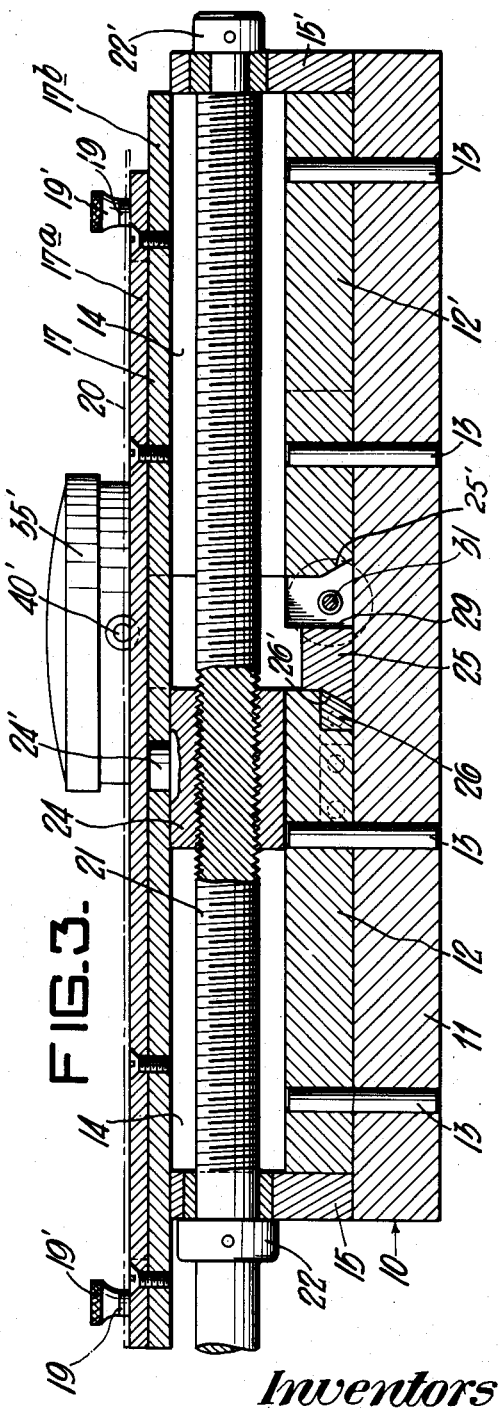
*Inventors:*
FREDERICK E. RICHARDSON
and JOHN V. STURTEVANT,
by: Donald G. Dalton
their Attorney.

Sept. 13, 1955  F. E. RICHARDSON ET AL  2,717,452
APPARATUS FOR DETERMINING THE CONTOUR
OF SHEET-METAL TEST SPECIMENS
Filed Dec. 23, 1949  4 Sheets-Sheet 3

*Inventors:*
FREDERICK E. RICHARDSON and
JOHN V. STURTEVANT,
by: Donald G. Dalton
their Attorney.

Sept. 13, 1955 F. E. RICHARDSON ET AL 2,717,452
APPARATUS FOR DETERMINING THE CONTOUR
OF SHEET-METAL TEST SPECIMENS
Filed Dec. 23, 1949 4 Sheets-Sheet 4
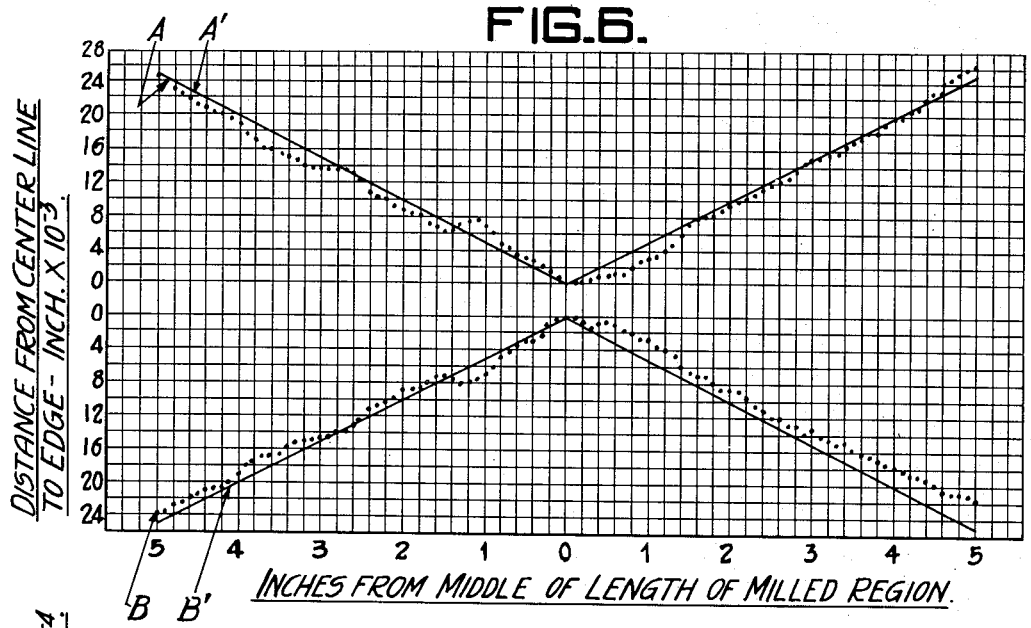
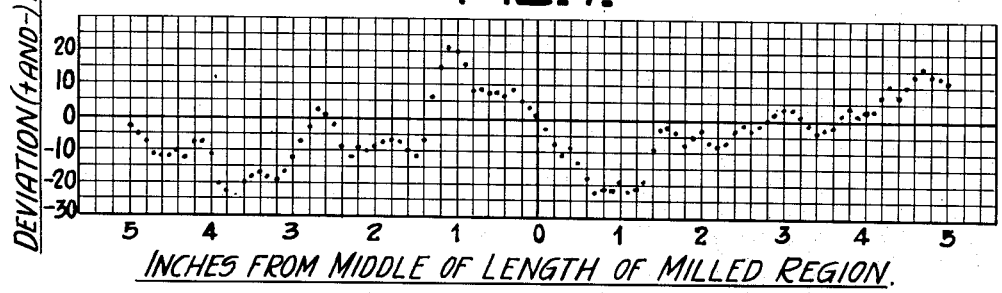
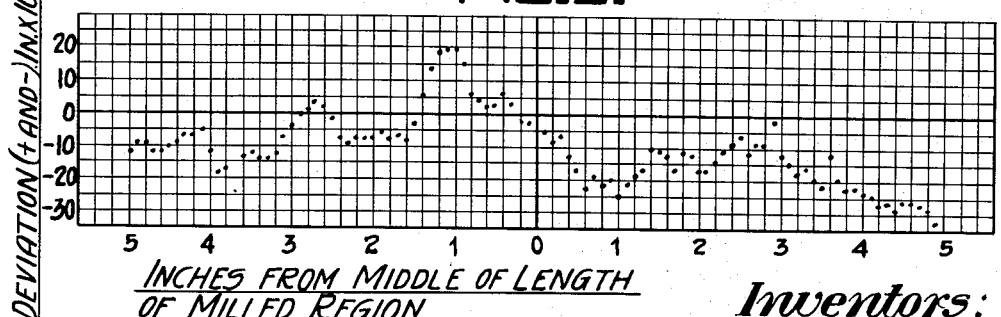
*Inventors:*
FREDERICK E. RICHARDSON
and JOHN V. STURTEVANT,
by: Donald G. Dalton
*their Attorney.*

United States Patent Office 2,717,452
Patented Sept. 13, 1955

2,717,452

APPARATUS FOR DETERMINING THE CONTOUR OF SHEET-METAL TEST SPECIMENS

Frederick E. Richardson, Pittsburgh, and John V. Sturtevant, Pleasant Hills, Pa.

Application December 23, 1949, Serial No. 134,664

12 Claims. (Cl. 33—174)

This invention relates to apparatus for accurately revealing the actual contour of machined edges of sheet-metal tensile-test specimens.

For the sake of accuracy, it is customary to machine the edges of sheared strips of sheet metal such as steel, to be used for tensile tests, at least in the mid-portion thereof, to remove roughness which might lead to premature tearing, and to provide smooth straight edges. It is also customary to machine the edges on a slight taper toward a minimum width at the transverse center line to insure breakage within the gauge length. Specimens are machined in a pack by milling one side thereof at a time. The two sides of the pack, therefore, may not be identical as to the contour of the edges of the specimens when finished.

The proper interpretation of data from a tensile test on sheet metal, for certain purposes, requires that the specimen be symmetrical about the longitudinal axis. Any deviation from true symmetry affects the accuracy and reproducibility of the test adversely. While the width of a specimen may be known accurately, it is also important to know the distance from the longitudinal center line to both edges at various points therealong, i. e., the exact contour of the edges in relation to the center line.

We have invented a novel device for progressively indicating the contour of the edges of a sheet-metal tensile-test specimen with great accuracy whereby individual specimens may be examined before testing to determine whether the deviations of their edges from a straight line exceed the permissible minimum. In a preferred embodiment, we provide a block including two elongated guide members mounted on a common base in exact alignment end-to-end and slightly spaced apart. Each guide member has a longitudinal slot therein, giving it a U-shape in section, the slots in the two members together forming a single trough. A bearing plate is mounted on the outer end of each member. A feed screw journaled in the bearing plates has a nut threaded thereon which has guided movement in the slots. A specimen-mounting slide is movable in spaced ways formed on the top of the members and is actuated by the nut. A carriage slidable transversely of the base between the members has a pair of dial gauges adjustably mounted thereon so their stems are adapted to engage the edges of the test specimen, respectively. The readings of the gauges taken as the slide is moved along its ways by rotation of the screw thus indicate the varying contour of the edges of the specimen. A plurality of gauge readings are preferably taken at predetermined intervals and are plotted on an enlarged scale to give a precise picture of the shape of the edges.

Figure 4:
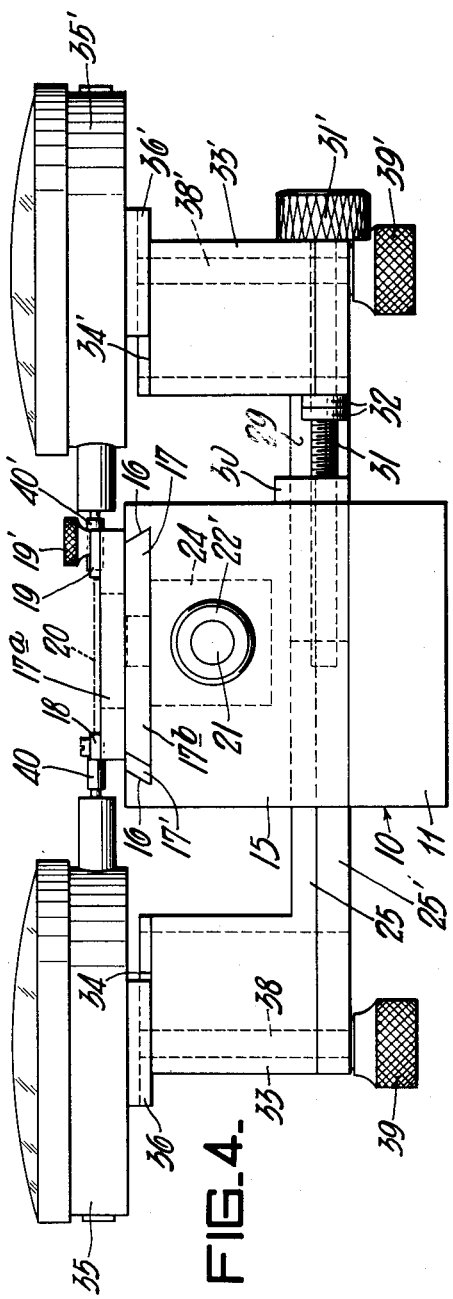
Figure 5:
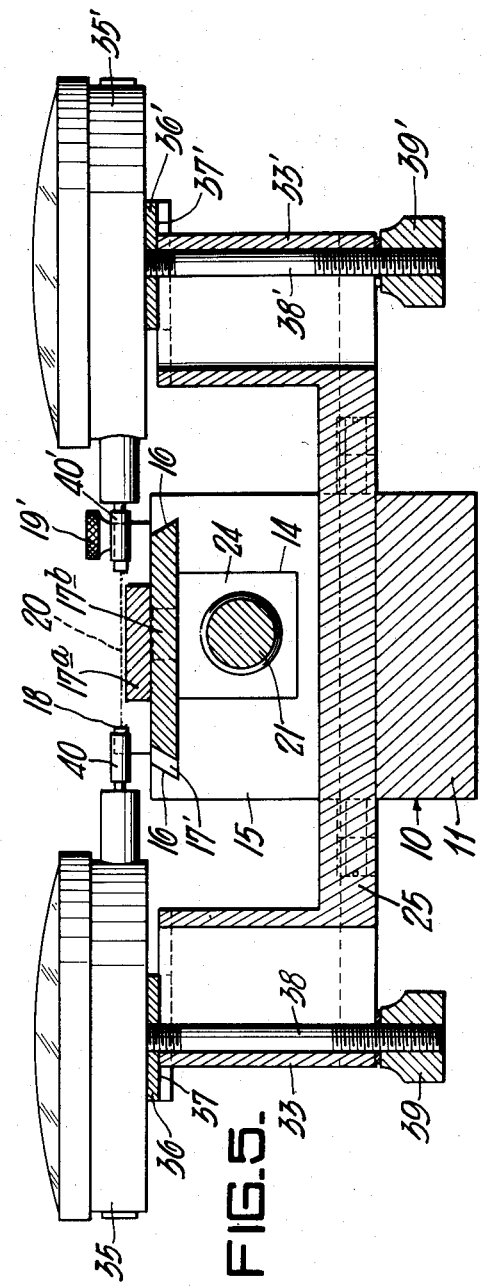

A complete understanding of the invention may be obtained from the following detailed description and explanation which refer to the accompanying drawings illustrating the present preferred embodiment and showing typical contour curves plotted from the data given thereby. In the drawings, Figure 1 is a plan view;
Figure 2 is a side elevation;
Figure 3 is a longitudinal section taken along the plane of line III—III of Figure 1;
Figure 4 is an end elevation;
Figure 5 is a transverse section taken along the plane of line V—V of Figure 2; and
Figures 6, 7 and 8 are curves showing the contours of the edges of a specimen plotted from data obtained by the device of Figures 1 through 5.

Referring in detail to the drawings and for the present to Figures 1 through 5, an elongated base block 10 is composed of a bottom plate 11 having a pair of guide members 12 and 12' secured thereto by pins 13 in aligned spaced end-to-end relation. Each of members 12 and 12' has a longitudinal slot 14 therein. The slots of the two members are precisely aligned to form a trough which is continuous except for the space between their adjacent ends. End plates 15 and 15' are secured to the outer ends of the guide members by screws.

Spaced longitudinal ways 16 are formed on top of the guide members and a specimen-mounting slide 17 is movable therealong. A wear strip 17' is disposed between the slide and one of the ways. The slide is composed of two plates 17a and 17b secured together by screws. The upper plate 17a has fixed abutments 18 on one side. At each end movable abutments in the form of wedging cams 19 are disposed opposite the abutments 18. They are pivoted on thumb screws 19' which serve to lock them in adjusted position. A specimen 20 to be examined is laid on the slide with one edge of its end portions engaging the abutments 18. The cams 19 are then turned to a position in which they bind the opposite edges of the specimen whereupon they are secured by tightening down the screws 19'. As clearly shown in Figure 1, the specimen 20 has side edges which are substantially parallel adjacent the ends but taper uniformly inwardly from a point spaced from the ends to substantially the middle thereof.

A fed screw 21 is journaled in bearings seated in the end plates 15 and 15' and is held against axial movement by thrust collars 22 and 22' pinned thereto. One end of the screw projects beyond the housing and is provided with a hand wheel 23 having a crank 23' thereon. A nut 24 threaded on the screw 21 fits snugly in the slots 14 in the guide members and, being thus held against rotation, travels longitudinally therealong on rotation of the screw. The nut has a tongue 24' extending upwardly therefrom into a hole in the lower plate 17b of the slide. As a result, the latter may be caused to travel back and forth on the ways 16 by rotation of the screw in the appropriate direction.

A carriage 25 is slidable transversely on the bottom plate 11 between the adjacent ends of the members 12 and 12'. The lower end edge of the member 12' is beveled as at 25'. The lower end edge of the member 12 has a slot milled therein to accommodate a tapered wedging bar 26, the inner face of which is also beveled at 26'. The beveled edge 25' and face 26' form transverse ways through block 10. The carriage has a dove-tailed section conforming to the beveled guide surfaces or ways 25' and 26' and serving to hold the carriage on the base. The wedging bar 26 is adjustable longitudinally by screws 27 and 27' threaded through tapped holes in brackets 28 and 28' secured to the opposite sides of guide member 12. By means of these screws, the bar may be actuated to clamp the carriage 25 frictionally in adjusted position transversely of the base block 10.

One side of the carriage is partially milled out adjacent one end as indicated at 29, to afford clearance for the overhanging end of a bar 30 secured to the guide member 12' opposite the bracket 28. An adjusting screw 31 for moving the carriage transversely of the block is journaled in one end of the latter, is threaded through a tapped hole in the bar 30 and extends beyond the latter through the space left by the milled-out portion 29. The screw is provided with a knob 31' at the outer end and with a thrust collar 32 pinned thereto adjacent the outer end of the milled-out portion 29. The screw turns freely in the carriage but imparts axial movement to the latter by virtue of its threaded relation with the tapped hole in bar 30.

The intermediate dovetailed portion of carriage 25 bridges the base plate 10 as shown in Figure 5, and has posts 33 and 33' upstanding therefrom, one at each end. Aligned parallel ways 34 and 34' are formed on top of the posts 33 and 33' extending in the direction of the length of the carriage and normal to the block 10. Dial gauges 35 and 35' are mounted on carriers in the form of slides 36 and 36' movable along the ways 34 and 34'. The posts 33 and 33' have vertical slots 37 therein. Studs 38 and 38' extending through these slots are threaded into the slides 36 and 36', respectively. Thumb nuts 39 and 39' mounted on lower ends of the studs permit the dial gauges to be secured individually in adjusted position along the ways 34 and 34'. The dial gauges are of a conventional type having stems 40 and 40'. The gauges are positioned so that their stems are adapted to engage opposite edges of the specimen 20 on slide 17.

In using the apparatus described above, after mounting the specimen 20 on the slide 17 as already explained, the slide is moved in one direction or the other by a rotation of the screw 21 until the point of minimum width of the specimen is substantially aligned with the stems 40 of the dial gauges. The carriage 25 is adjusted transversely of the housing until the stems are approximately equidistant from the adjacent edge of the specimen. The gauges are then adjusted by loosening thumb nuts 39 and 39', until the stems engage the edges of the specimen with sufficient pressure to cause a reading thereon somewhat greater than zero. Any suitable reading may serve as an arbitrary zero. It is not necessary that the readings of the two gauges be the same.

Rotation of the screw in one direction or the other will cause a corresponding longitudinal movement of the slide 17 with the specimen 20 thereon. As this movement continues, the readings of the gauges increase in accordance with the taper of the edges of the specimen from the midpoint toward each end. By recording the readings of the gauges at closely-spaced intervals, say each tenth of an inch, minor variations in the width of the specimen from the center line to each edge may be determined. It is not necessary, however, that the center line of the specimen be precisely superimposed on the center line of the device. When the full length of one tapered portion of the specimen has been traversed past the stems 40 and 45, the slide is restored to central position and then moved in the opposite direction for a similar determination.

The gauge readings taken at intervals as explained above, when plotted as shown in Figure 6, give an accurate picture of the contour of the edges of the specimen from point to point along its length. In Figure 6, the curve A results from plotting the difference between the reading of one dial gauge at various points along the length of the specimen and the initial reading at the midpoint of minimum width which serves as an arbitrary zero. There are two zero axes shown in Figure 6 with an ordinate scale ascending from one and descending from the other. The distance between the zero axes is arbitrary and has no relation to the actual minimum width of the specimen. Curve B plotted on the descending scale of ordinates represents the contour of the other edge of the specimen. Solid lines A' and B' represent the desired contour of the edges, i. e., a straight edge having a predetermined slope. It is plainly apparent from Figure 6 that, while the edges of a given specimen followed the theoretical line fairly closely, slight deviations therefrom existed from point to point, varying in magnitude.

Figures 7 and 8 are graphs further showing the contours of the edges of the specimen. Each graph is plotted to show on an enlarged scale, the actual deviation of the contour of the edge of the specimen from the theoretical straight line, e. g., the difference between curves A and A' of Figure 6. It will be observed that in the first two inches measuring from the left side of Figure 7, the deviation was negative at all points while a slightly positive deviation occurred early in the third inch after which a negative deviation appeared for another inch followed by positive deviations to the point of minimum width. A side-by-side comparison of the two curves shown by Figures 7 and 8 clearly reveals the contours of the two edges of the specimen and indicates the direction as well as the magnitude of the deviation from the theoretical edge.

It will be apparent that the invention is characterized by important advantages as a tool for interpreting the results of tensile tests on sheet metal or determining whether the edge contour of a specimen is sufficiently close to the theoretical straight line to warrant the soundness of conclusions based on data taken at the tensile test. The apparatus is simple and easy to use but is characterized by such accuracy that deviations as small as a ten-thousandth of an inch may readily be noted. The moving parts are few and the wear thereon is slight. The several adjusting means provided afford a high degree of flexibility and permit the study of specimens of various sizes.

The gauges 35 and 35' are wholly independent of each other in respect both to their actuation and indication. That is, each gauge is actuated in accordance with the character of the specimen edge engaged by its stem, regardless of the position of the other gauge. The apparatus thus functions to gauge the two edges of the specimen simultaneously but independently.

A further advantage of the device is that it may be used to reveal the actual width of the specimen at any given point. To this end, the posts 33 and 33' are adjusted so that there is a known distance between the ends of the gauge stems, slightly less than the minimum width of the specimen, e. g., by placing a standard such as a gauge block between the stems. When the specimen has been secured on the slide 17, carriage 25 is adjusted so that both gauges show approximately the same reading. The actual width of the specimen at any point, therefore, is the known base distance between the stems plus the readings of both gauges at that point.

We claim:

1. Apparatus for determining the contour of the edges of a strip of sheet material comprising an elongated block, spaced longitudinal ways on the top thereof, a strip-mounting slide movable in said ways, a carriage slidable transversely of the block, and a dial gauge mounted on the carriage with its stem in position to engage one edge of a strip on said slide, said carriage including a bridging portion extending beyond the block on opposite sides thereof and a post upstanding from the bridging portion.

2. Apparatus for determining the contour of the edges of a strip of sheet material comprising an elongated block, spaced longitudinal ways on the top thereof, a strip-mounting slide movable in said ways, a carriage slidable transversely of the block, a dial gauge mounted on the carriage with its stem in position to engage one edge of a strip on said slide, and a wedging bar movable transversely through the block alongside said carriage adapted frictionally to lock it in adjusted position on the block.

3. Apparatus for determining the contour of the edges of a strip of sheet material comprising an elongated block, spaced longitudinal ways on the top thereof, a strip- mounting slide movable in said ways, a carriage slidable transversely of the block, a dial gauge mounted on the carriage with its stem in position to engage one edge of a strip on said slide, said block being composed of a bottom plate, and a pair of aligned guide members thereon in spaced end-to-end relation, said carriage being slidable on said bottom plate between said members.

4. The apparatus defined by claim 3 characterized by a wedging bar between said carriage and one guide member adapted to force it against the other member.

5. The apparatus defined by claim 3 characterized by ways extending along the carriage, said gauge being adjustable along said last-mentioned ways.

6. Apparatus for determining the contour of the edges of a strip of sheet material comprising a base block, a pair of elongated guide members secured thereto in aligned, spaced, end-to-end relation, a longitudinal slot in each member, the two slots forming a common trough, a screw in said trough, a nut on the screw non-rotatable in the trough, ways along the tops of the guide members, a slide movable along said ways by said nut, a carriage slidable transversely on said block between said members, and a dial gauge mounted on said carriage with its stem in position to engage the edge of a strip on said slide.

7. Apparatus for determining the contour of the edges of a strip of sheet material comprising an elongated block, spaced longitudinal ways on the top thereof, a strip-mounting slide movable in said ways, a carriage slidable transversely of the block, said carriage having longitudinal ways thereon adjacent one end, a gauge carrier adjustable along said last-mentioned ways, and a dial gauge mounted on the carrier with its stem in position to engage the edge of a strip on said slide.

8. Apparatus for determining the contour of the edges of a strip of sheet material comprising an elongated block, spaced longitudinal ways on the top thereof, a strip-mounting slide movable in said ways, a carriage slidable transversely of the block, and a dial gauge mounted on the carriage with its stem in position to engage one edge of a strip on said slide, said carriage having a dove-tail portion and said block having transverse surfaces conforming to said portion.

9. Apparatus for determining the contour of the edges of a strip of sheet material comprising an elongated block, spaced longitudinal ways on the top thereof, a strip-mounting slide movable in said ways, a carriage slidable transversely of the block, said carriage including a bridging portion extending beyond the block on opposite sides thereof and a post upstanding from the bridging portion, said post having ways thereon, a gauge carrier adjustable on said last-mentioned ways, and a dial gauge mounted on the carrier with its stem in position to engage one edge of a strip on said slide.

10. The apparatus defined by claim 9 characterized by said post having a vertical slot therein and a set screw in said slot securing said gauge carrier in adjusted position.

11. Apparatus for determining the contour of the edges of a strip of sheet material comprising an elongated block, a longitudinal slot in the upper face of said block, longitudinal ways on said face one on each side of said slot, a strip-mounting slide bridging said slot and movable in said ways, said block also having spaced guide surfaces therein intermediate its ends and below said longitudinal ways, a carriage slidable between said guide surfaces, and a dial gauge mounted on the carriage for cooperation with an edge of a strip on said slide.

12. The apparatus defined by claim 11 characterized by a screw journaled longitudinally in said slot and a nut non-rotatable in said slot threaded on said screw and engaging said slide.

References Cited in the file of this patent

UNITED STATES PATENTS

| Re. 22,953 | Praeg | Dec. 23, 1947 |
|---|---|---|
| 1,152,686 | Zahorik | Sept. 7, 1915 |
| 1,364,534 | Walter | Jan. 4, 1921 |
| 1,387,802 | Novotny | Aug. 16, 1921 |
| 1,667,109 | Garlent | Apr. 24, 1928 |
| 2,078,352 | Summers | Apr. 27, 1937 |
| 2,159,335 | Markwick | May 23, 1939 |
| 2,184,035 | Buccicone | Dec. 19, 1939 |
| 2,317,468 | Krieger | Apr. 27, 1943 |
| 2,337,697 | Varney | Dec. 28, 1943 |
| 2,406,793 | Benkoe | Sept. 3, 1946 |
| 2,431,099 | Weisman | Nov. 18, 1947 |
| 2,458,344 | Carroll | Jan. 4, 1949 |
| 2,462,226 | Rosenow | Oct. 22, 1949 |
| 2,543,492 | Garay | Feb. 27, 1951 |
| 2,547,717 | Polk | Apr. 3, 1951 |

FOREIGN PATENTS

| 314,502 | Germany | Sept. 23, 1919 |